United States Patent [19]
Harris et al.

[11] 3,822,651

[45] July 9, 1974

[54] WATER COOLED KILN FOR WASTE DISPOSAL

[76] Inventors: David W. Harris, 7135 Hollywood Blvd., Los Angeles, Calif. 90046; Chadwell O'Connor, 2024 Galaxy Dr., Newport Beach, Calif. 92660

[22] Filed: Sept. 4, 1973

[21] Appl. No.: 394,050

[52] U.S. Cl................... 110/10, 110/14, 432/116
[51] Int. Cl............................................ F23g 5/06
[58] Field of Search ......... 110/8 R, 10, 14; 432/116

[56] References Cited
UNITED STATES PATENTS

| | | | |
|---|---|---|---|
| 1,550,591 | 8/1925 | Stone............................. | 432/116 X |
| 3,034,776 | 5/1962 | Hennenberger et al. ....... | 432/116 X |
| 3,716,339 | 2/1973 | Shigaki et al. .................. | 110/14 X |
| 3,749,033 | 7/1973 | Sugano et al. ................... | 110/10 |

*Primary Examiner*—Kenneth W. Sprague
*Attorney, Agent, or Firm*—Wolfe, Hubbard, Leydig, Voit & Osann, Ltd.

[57] ABSTRACT

A rotary kiln formed by a plurality of pipes joined to define an inner cylindrical surface and being interconnected to permit water flow through the pipes. Water from the pipes is circulated to a steam drum for steam removal. The pipes are joined so as to define a plurality of intermediate openings for gas porosity and provision is made for introducing controlled amounts of air into the kiln and for enclosing and capturing volatile gases generated by the burning. A nonclogging waste chute feeds the kiln, and an associated furnace both further utilizes the heat of combustion and provides a static burning location for exceptionally large items of waste.

4 Claims, 5 Drawing Figures

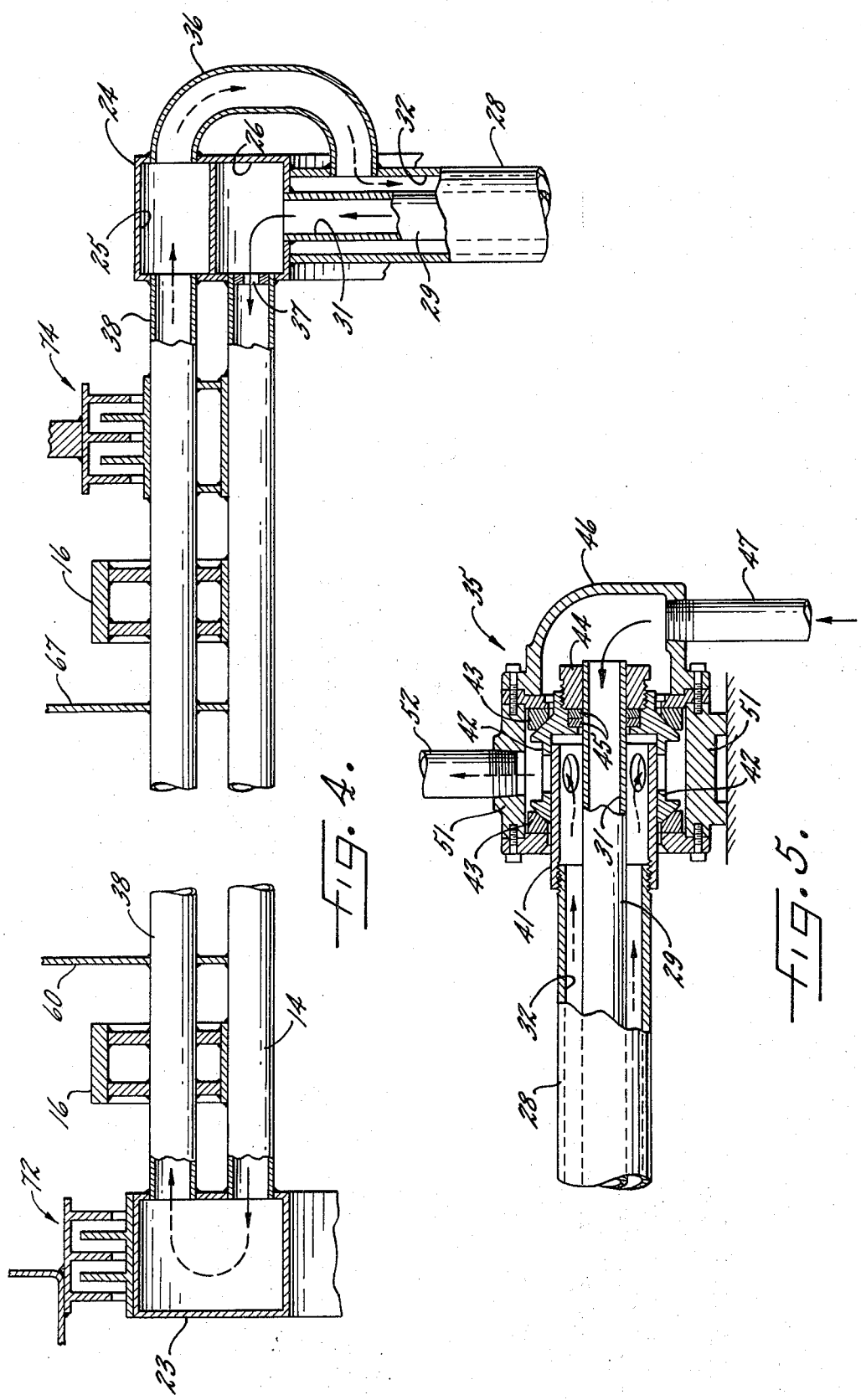

3,822,651

WATER COOLED KILN FOR WASTE DISPOSAL

This invention relates generally to waste burning structure and more particularly concerns a rotary water cooled kiln primarily intended for burning wood waste.

Even a modern tree harvesting operation leaves approximately 50 percent of the tree on the ground in the form of leaves, twigs, stumps and short, or otherwise nonuseful, lengths. Many modern lumber mills handle logs in dry form and large amounts of material drop from the logs as they are handled which, together with bark, sawdust and lengths too short for the mill (in some cases, logs less than eight feet long are too short), comprise a great quantity of waste material.

All together, the harvesting of trees and forming of lumber or plywood ribbons generates many tons of burnable waste, and ecological and power supply pressures have made the burning of this material and efficient use of the resulting energy, as by generating steam, a highly attractive goal.

While the burning of wood seems superficially simple, many problems arise in trying to handle the kind of material under discussion. In the first place, wood burns at rather high temperatures and large volume wood fires can easily exceed the temperature limits of refractory kiln lining materials. The waste itself also varies from wet, very large stumps, to dry, explosively combustible sawdust. Moreover, unless expensive sorting and separating equipment and procedures are used, the waste material varies widely in size, moisture content and amount of entrapped foreign material such as dirt, stray metal, rock and even boulders a foot or two in diameter.

It is the primary aim of the invention to provide a kiln and associated structure for efficiently burning wood waste material as discussed above as well as virtually any other kind of burnable waste, despite size, moisture content and kind of aggregate makeup.

It is also an object of the invention to provide a kiln of the kind characterized above in association with a furnace for the efficient generation of steam.

Another object is to provide a kiln and associated structure of the above described type which gives highly flexible control of the burning process including such factors as air or oxygen admission, agitation of the fire bed, addition of supplementary fuel, and the timing of the flow of waste material to the fire.

A further object is to provide a kiln and associated structure of the above character having low operating costs and low maintenance costs. A somewhat related object is to provide such structure with the ability to reclaim useful volatile hydrocarbons from the burning wood waste.

Other objects and advantages of the invention will become apparent upon reading the following detailed description and upon reference to the drawings, in which:

FIG. 4 is a fragmentary section taken approximately along the line 4—4 in FIG. 2; and FIG. 5 is an enlarged fragmentary section of a portion of the structure otherwise appearing in FIG. 1.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
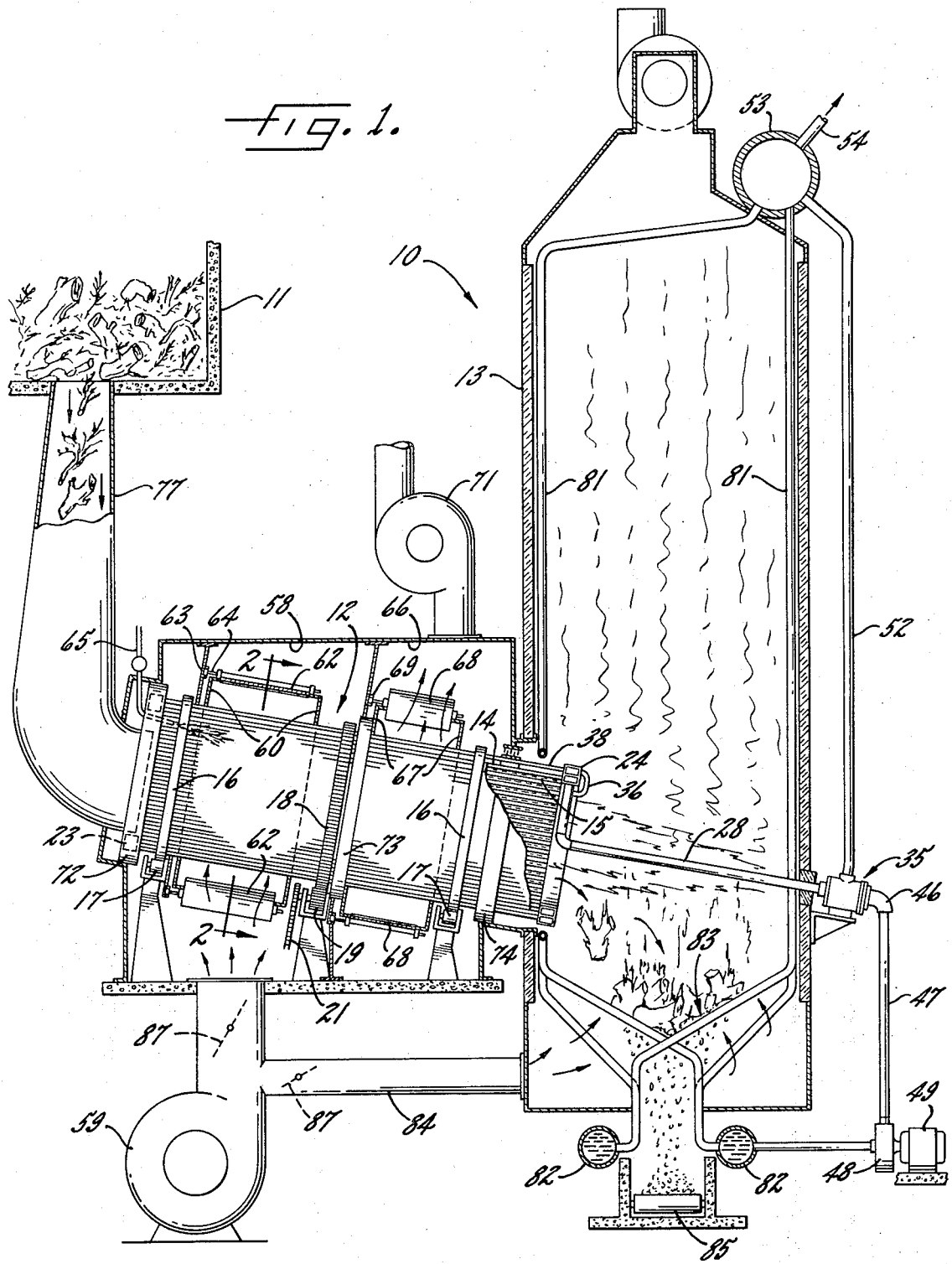
FIG. 1 is a vertical section, partially diagrammatic, of a kiln and associated structure embodying the present invention.

Turning now to FIG. 1, there is shown a kiln and furnace structure 10 embodying the invention including a waste-receiving enclosure 11, a rotary kiln 12 and a furnace 13. In operation, burnable waste in a wide range of sizes and conditions is simply dumped in the enclosure 11, from which it falls into the upper end of the kiln 12, which is horizontally tilted, where combustion begins. The kiln rotates and the burning waste slowly tumbles downwardly forming a kind of spiraling fire bed until what has not been consumed spills into the furnace 13.

Figure 2:
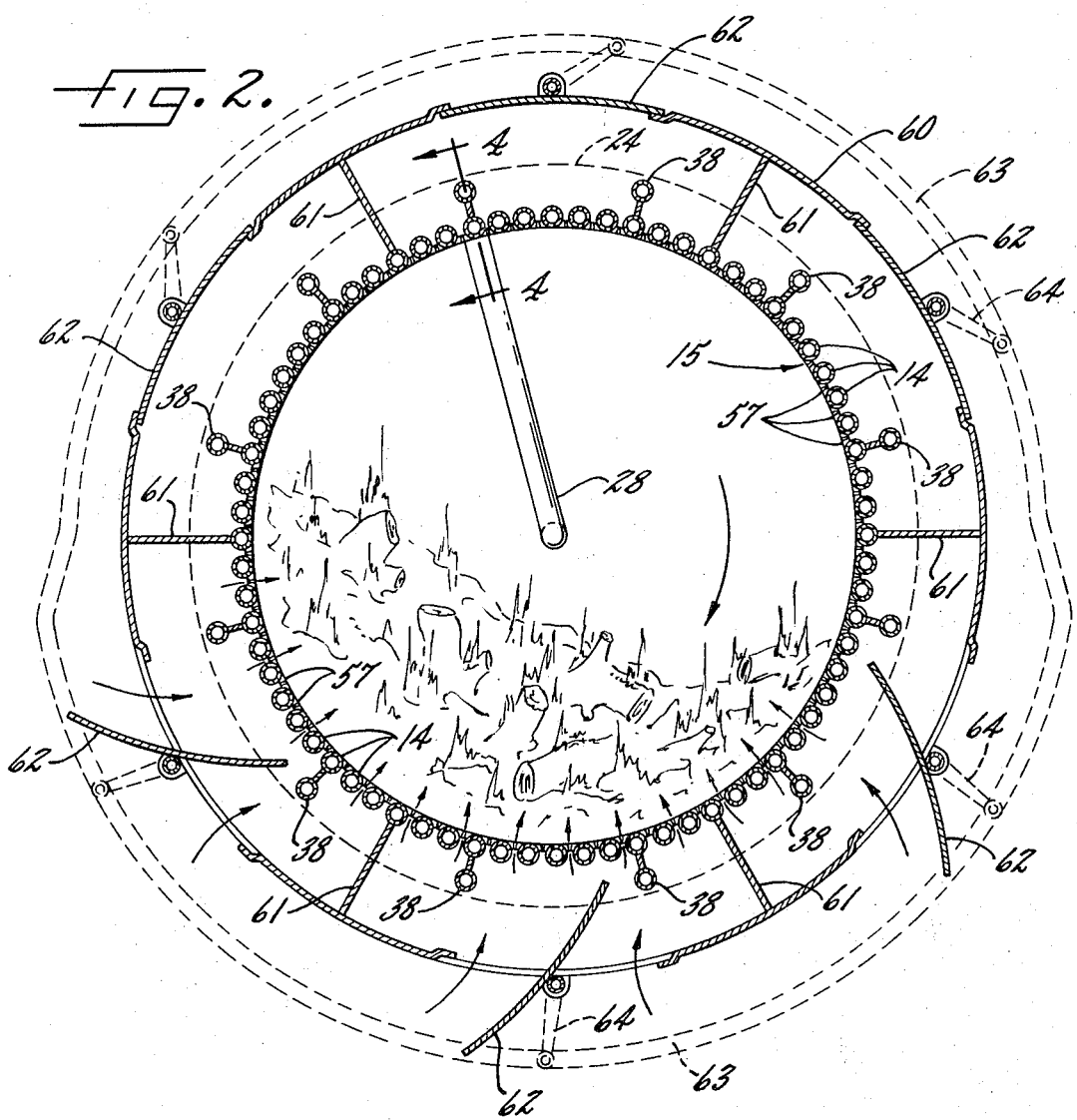
FIG. 2 is an enlarged section taken approximately along the line 2—2 in FIG. 1.

Pursuant to the invention, the kiln 12 is formed of a plurality of pipes 14 secured together to define a generally cylindrical surface 15 (see also FIG. 2). A pair of bands 16 ring the pipes 14 and form tracks riding on supporting rollers 17 which mount the kiln for rotation, and a ring gear 18 also is fixed to the pipes 14 and is meshed with a pinion 19 driven from a chain 21 so as to rotate the kiln on the rollers 17. At both the upper and lower ends of the cylindrical surface 15, the pipes 14 are secured together and connected by annular, rectangular sectioned, members 23 and 24 (see also FIG. 4); the member 24 being divided into annular inner and outer chambers 25 and 26, respectively.

Preferably, water is circulated through the kiln pipes 14 from and to a pair of concentric pipes 28 and 29 defining inner and outer passages 31 and 32, respectively. The pipes 28, 29 are disposed on the axis of the cylindrical surface 15 and run from a rotary steam joint 35 through a right angle elbow to the member 24. The inner pipe 29, which carries water to the kiln 12, opens into the inner chamber 26 and the outer pipe 28 is connected by a loop 36 to the outer annular chamber 25. The pipes 14 making up the kiln surface 15 all open to the inner chamber 26 through restricting orifices such as the orifice 37 which assure flow through all of the pipes, and the pipes 14 also all open into the upper member 23. A group of additional pipes 38 run back from the upper member 23 to the outer chamber 25, from which there is flow through the loop 36 to the passage 32 between the pipes 28, 29.

The joint 35 is of fairly standard type with the pipe 28 being secured to the sleeve 41 having a sliding fit in a collar 42 mounted for rotation and universal movement in a pair of bearing rings 43. The inner pipe 29 is fitted through a plug 44 secured to the collar 42 so as to hold packing 45 to seal between the passages 31, 32. The inner pipe 29 opens into a housing 46 and is connected by a line 47 to a water pump 48 driven by a motor 49. The sleeve 41 and collar 42 have alined openings connecting the passage 32 to a housing 51 that, in turn, is connected by a line 52 to a steam drum 53 at the top of the furnace 13.

It can thus be seen that water is driven by the pump 48 through all of the pipes 14 defining the kiln to the drum 53 with the flow being as indicated by the arrows in FIGS. 4 and 5. When in operation, the water removes heat from the metal making up the kiln and steam is extracted from the superheated water in the drum 53, whereupon the steam is drawn off through a line 54.

Figure 3:
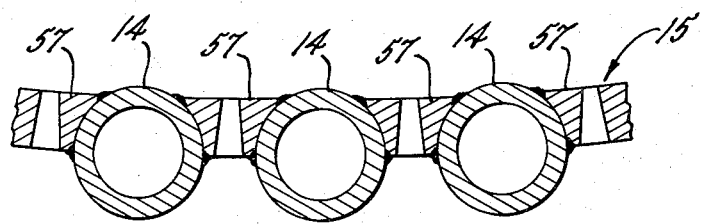
FIG. 3 is an enlarged fragmentary section showing a portion of the structure appearing in FIG. 2.

In carrying out the invention in its illustrated form, the pipes are joined by perforated strips 57 defining a plurality of openings intermediate the pipes so that the cylindrical surface 15 is gas porous (see FIG. 3). For delivering controlled amounts of gas, for burning, through the porous surface 15, the kiln 12 is enclosed in a chamber 58 fed by a blower 59, and an annular collar 60 is mounted on the pipes 14 that is sectioned by walls 61 and selectively opened by pivoted panels 62, one for each section (see FIG. 2). A substantially circular box cam 63 is mounted in the chamber 58 to receive cam followers on the ends of crank arms 64 connected to the panels. In the illustrated embodiment, the shape of the cam 63 and the angles of the crank arms 64 open up the panels 62 as they move under the tumbling fire bed in the chamber 15. The cam is shaped to close the panels as the associated collar sections move above the fire bed. Air is thus driven by the blower 59 through the burning material and into the cylindrical kiln surface 15.

For starting or assisting combustion, a source 65 of additional fuel such as oil or natural gas opens into the upper end of the kiln (see FIG. 1).

As a feature of the invention, useful volatile gases, such as the pinenes and camphene generated upon burning wood, are collected by providing a second chamber 66 surrounding the lower end of the kiln 12 and a second collar 67 mounted on the kiln formed like the collar 60 in sections opened by panels 68 controlled by crank arms and a box cam 69. In this case, the panels 68 are opened as they pass over the tumbling fire bed so that the gases escape and are pulled away and delivered by a blower 71.

In the illustrated construction, the chambers 58, 66 are sealed by simple labyrinth seal assemblies 72, 73 and 74 (see FIGS. 1 and 4).

To provide a virtually nonclogging arrangement for feeding wood waste material to the kiln 12, the enclosure 11 is connected to the upper open end of the cylindrical surface 15 by a chute 77 having its upper end dimensioned to receive the largest size unit to be burned — such as an eight-foot long log — and the chute 77 is tapered to increase in cross section as it leads into the kiln. The increasing size of the chute 77 prevents jam-ups and allows the chute to be completely filled, assuring a steady flow of material for burning and also blocking against uncontrolled air flow into the open end of the kiln.

Pursuant to the invention, the furnace 13 is somewhat modified to cooperate with the kiln 12. The furnace is lined, as is conventional, with heat extracting boiler pipes 81 leading from water reservoirs 82, which also feed the pump 48, to the steam drum 53. In the illustrated arrangement, the lower portions of the pipes 81 are angled and crossed to define a fire grate 83 underlying the lower discharge end of the kiln 12. The blower 59 feeds gas for combustion through a conduit 84 to and beneath the fire grate 83 so as to facilitate burning at that location. Large units of burnable waste, such as tree stumps, which might not be fully consumed in the kiln 12, thus fall onto the fire grate 83 for continued and complete burning. The pipes making up the grate 83 are spaced sufficiently far apart to permit ashes and nonburnable material such as rocks or scrap metal to fall through the grate into a conveyor and removal system 85.

The kiln 12 is characterized by great control flexibility. The rate of rotation, which in a kiln on the order of 40 feet long and 10 feet in diameter, might be only 1 rpm, controls the rate at which the burning material tumbles and spirals down the cylindrical surface 15. The speed of the blower 59 as well as the setting of a pair of dampers 87 controls the flow of combustion gas to the fire. Also, supplementary fuel from the source 65 can be added if desired. The temperature of the metal making up the kiln 12 can be kept to safe levels regardless of the type of fuel being consumed by extracting heat via the circulating water and, of course, the rate of circulation can be adjusted by appropriate control of the pump 48.

Those skilled in this art will appreciate that the kiln 12 is capable of handling burnable waste material over a wide range of size, moisture content, and aggregate makeup. The water cooling inherent in the kiln design allows burning at extremely high temperatures, and the flexibility of the burning control permits efficient handling of a wide range of variables. The ability to reclaim useful volatile hydrocarbon increases the utility of the structure 10. The structure can be operated and maintained at low cost so as to not only dispose of wood waste inexpensively without requiring sorting or elaborate handling but also to efficiently obtain an energy output in the form of steam.

We claim as our invention:

1. A rotary kiln comprising, in combination, a plurality of pipes secured together to define an inner generally cylindrical surface, means mounting said plurality of pipes for rotation about the axis of said cylindrical surface with the axis being horizontally tilted so as to have a high end and a low end, means for rotating said plurality of pipes on said mounting, a feeding chute into which burnable waste material can be stacked which opens into the high end of said cylindrical surface, said pipes being interconnected for circulating water flow and having a water input line and a water discharge line, means for circulating water through said lines including a steam drum connected to said discharge line for separating steam from the water, said pipes being secured so as to define a plurality of intermediate openings so that said cylindrical surface is gas porous, and means for delivering controlled amounts of gas for burning through selected portions of said porous cylindrical surface.

2. The combination of claim 1 including a steam generating furnace disposed adjacent to said kiln with said low end opening into the furnace, said furnace including a plurality of boiler pipes opening into said steam drum, and said boiler pipes being formed to define a fire grate at the bottom of said furnace beneath the open lower end of said kiln for receiving incompletely consumed material for continued burning.

3. The combination of claim 1 in which said feeding chute has an upper end dimensioned to receive the largest sized unit to be burned in said kiln, said chute being tapered to increase in cross section from said upper end so as to be substantially nonclogging, and said water input line and water discharge line being located at said lower end.

4. The combination of claim 1 including means defining a chamber surrounding a portion of said pipes for receiving through said gas porous surface volatile gases generated by material burning within said surface.

* * * * *